US009308930B2

(12) United States Patent
Bostick et al.

(10) Patent No.: US 9,308,930 B2
(45) Date of Patent: Apr. 12, 2016

(54) STEERING WHEEL WITH SWITCH ASSEMBLY

(75) Inventors: Bill Bostick, Saint Clair, MI (US); Gregory Hamman, Grand Blanc, MI (US); Eugene Kahn, Davisburg, MI (US); Richard Matsu, Plymouth, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 1 day.

(21) Appl. No.: 13/441,084

(22) Filed: Apr. 6, 2012

(65) Prior Publication Data

US 2013/0263692 A1  Oct. 10, 2013

(51) Int. Cl.
  *G05G 1/10* (2006.01)
  *B62D 1/06* (2006.01)
  *B62D 1/04* (2006.01)

(52) U.S. Cl.
  CPC ............. *B62D 1/046* (2013.01); *Y10T 74/2087* (2015.01); *Y10T 74/20834* (2015.01)

(58) Field of Classification Search
  CPC ............... B62D 1/046; Y10T 74/2087; Y10T 74/20834; G05G 1/10; H01H 9/00
  USPC .............. 74/552, 558; 200/4, 61.54; 280/731; 29/894.1
  See application file for complete search history.

(56) References Cited

U.S. PATENT DOCUMENTS

| | | | |
|---|---|---|---|
| 5,335,743 A | | 8/1994 | Gillbrand et al. |
| 6,453,769 B2 * | | 9/2002 | Sakurai ........................... 74/552 |
| 6,624,365 B2 * | | 9/2003 | Miyako et al. .............. 200/61.54 |
| 6,626,458 B2 * | | 9/2003 | Fujita et al. ................. 280/728.3 |
| 6,639,160 B2 * | | 10/2003 | Ibe et al. ..................... 200/61.54 |
| 6,768,067 B2 * | | 7/2004 | Adachi et al. .............. 200/61.54 |
| D503,665 S * | | 4/2005 | Pfeiffer et al. ................ D12/176 |
| 6,889,576 B2 | | 5/2005 | Miltenberger |
| 6,948,399 B2 | | 9/2005 | Yoshikawa et al. |
| 6,997,281 B2 * | | 2/2006 | Chernoff et al. .............. 180/333 |
| 7,053,322 B2 * | | 5/2006 | Helmstetter et al. ........ 200/61.54 |
| D527,320 S * | | 8/2006 | Pfeiffer ........................ D12/176 |

(Continued)

FOREIGN PATENT DOCUMENTS

| | | |
|---|---|---|
| FR | 2907721 A1 | 5/2008 |
| JP | 2006205890 A | 8/2006 |

OTHER PUBLICATIONS

International Preliminary Report on Patentability regarding International Application No. PCT/US2013/033461 dated Oct. 7, 2014 and Written Opinion dated May 14, 2013.

(Continued)

*Primary Examiner* — Adam D Rogers
(74) *Attorney, Agent, or Firm* — Harness, Dickey & Pierce, P.L.C.

(57) ABSTRACT

A steering wheel is provided that may include a central member, a rim, a structural member, a switch-frame and a switch assembly. The rim may be spaced apart from the central member. The structural member may extend between the central member and the rim. The switch-frame may be secured relative to the structural member and may include first, second, and third members cooperating to define an opening. The first member may be disposed between the central member and the rim and may extend laterally across the structural member. The second and third members may be spaced apart from each other and may extend from the first member toward the rim. The switch assembly may be mounted to the switch-frame and may at least partially extend through the opening.

18 Claims, 8 Drawing Sheets

(56) References Cited

U.S. PATENT DOCUMENTS

| | | | |
|---|---|---|---|
| 7,148,437 B2* | 12/2006 | Wahl et al. | 200/61.54 |
| 7,213,486 B2* | 5/2007 | Lorenz | 74/552 |
| 7,439,459 B2* | 10/2008 | Hyun et al. | 200/5 R |
| 7,547,042 B2* | 6/2009 | Chapelain et al. | 280/731 |
| 7,685,905 B2* | 3/2010 | Miltenberger et al. | 74/552 |
| 8,136,424 B2* | 3/2012 | Takahashi et al. | 74/552 |
| 2002/0046936 A1* | 4/2002 | Ibe et al. | 200/61.54 |
| 2003/0037633 A1* | 2/2003 | Grilli et al. | 74/552 |
| 2004/0083849 A1* | 5/2004 | Umemura et al. | 74/552 |
| 2005/0106913 A1* | 5/2005 | Khoury et al. | 439/164 |
| 2005/0252332 A1* | 11/2005 | Miltenberger et al. | 74/552 |
| 2010/0200375 A1* | 8/2010 | Han et al. | 200/61.54 |
| 2010/0251849 A1* | 10/2010 | Kurata et al. | 74/552 |
| 2011/0132731 A1* | 6/2011 | Bowman et al. | 200/61.54 |

OTHER PUBLICATIONS

International Search Report regarding Application No. PCT/US2013/33461 dated May 17, 2013.

* cited by examiner

STEERING WHEEL WITH SWITCH ASSEMBLY

FIELD

The present disclosure relates to a steering wheel for a vehicle and, more particularly, to a steering wheel having a switch assembly.

BACKGROUND

This section provides background information related to the present disclosure and is not necessarily prior art.

A vehicle typically includes a steering wheel that a driver can manipulate to steer the vehicle as desired. Many steering wheels include one or more switch assemblies for controlling one or more electrical accessory systems in the vehicle, such as a stereo, cruise control, and/or mobile communication systems, for example. Integrating these switch assemblies into the steering wheel allows the driver to control the accessory systems with minimal disruption to the safe operation of the vehicle.

Market pressures are urging steering wheel manufacturers to add more control switches to these switch assemblies while maintaining certain aesthetic and ergonomic features of the steering wheel. Accordingly, the switch assemblies are becoming larger in size while the space in which to package the switch assemblies may remain substantially unchanged. This can create fit and finish problems when desired aesthetic features are incorporated into the steering wheel design.

SUMMARY

This section provides a general summary of the disclosure, and is not a comprehensive disclosure of its full scope or all of its features.

In one form, the present disclosure provides a steering wheel that may include a central member, a rim, a structural member, a switch-frame and a switch assembly. The rim may be spaced apart from the central member. The structural member may extend between the central member and the rim. The switch-frame may be secured relative to the structural member and may include first, second, and third members cooperating to define an opening. The first member may be disposed between the central member and the rim and may extend laterally across the structural member. The second and third members may be spaced apart from each other and may extend from the first member toward the rim. The switch assembly may be mounted to the switch-frame and may at least partially extend through the opening.

In another form, the present disclosure provides a switch housing for a steering wheel that may include a back-cover and a switch-frame. The back-cover may be adapted to be secured to a central shell of the steering wheel and may define a cavity adapted to receive at least a portion of a structural member of the steering wheel. The switch-frame may be mounted to the back-cover and may be spaced apart from the structural member. The switch-frame may include first, second and third members defining an opening and adapted to support a switch assembly. The second and third members may extend from opposite ends of the first member.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
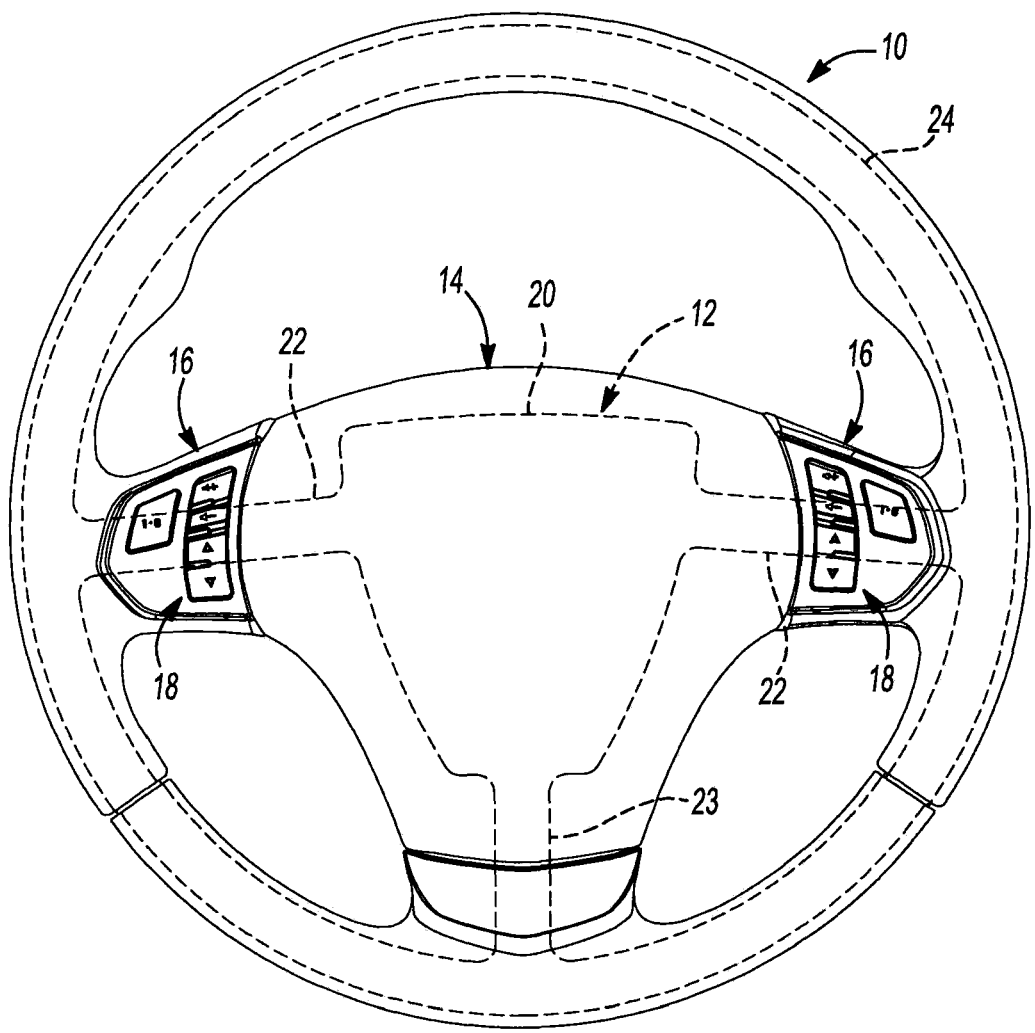
FIG. 1 is a plan view of a steering wheel including a switch-housing and switch assembly according to the principles of the present disclosure.

Example embodiments will now be described more fully with reference to the accompanying drawings. Example embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers, and/or sections, these elements, components, regions, layers and/or sections should not be limited by these terms. These terms may be only used to distinguish one element, component, region, layer, or section from another region, layer, or section. Terms such as "first," "second," and other numerical terms when used herein do not imply a sequence or order unless clearly indicated by the context. Thus, a first element, component, region, layer, or section discussed below could be termed a second element, component, region, layer, or section without departing from the teachings of the example embodiments.

Spatially relative terms, such as "inner," "outer," "beneath," "below," "lower," "above," "upper" and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

With reference to FIGS. 1-8, a steering wheel 10 is provided and may include a frame 12, a central shell 14, one or more switch housings 16, and one or more switch assemblies 18. The steering wheel 10 may be incorporated into a vehicle (not shown) such as an automobile, a watercraft, or an aircraft, for example, or any other type of vehicle. The steering wheel 10 may be operatively coupled to a steering mechanism (not shown) of the vehicle, which may be operable to steer the vehicle.

As shown in FIG. 1, the frame 12 may include a central member 20, a plurality of laterally-extending structural members 22, a downwardly-extending structural member 23, and an outer rim 24. The structural members 22, 23 may extend radially outward from the central member 20 and may support the rim 24. The rim 24 surrounds the central member 20 and the structural members 22, 23 and generally defines a perimeter of the steering wheel 10. The central member 20, structural members 22, 23, and the rim 24 may be formed from a die cast magnesium, for example, and/or any other suitable structural material. While the particular embodiment shown in the figures includes two laterally-extending structural members 22 and one downwardly-extending structural member 23, in some embodiments, the steering wheel 10 could include any other number or arrangement of structural members 22, 23. The rim 24 may be encased in a relatively compliant polymeric layer 26 (FIGS. 4 and 8) such as a polyurethane foam, for example, or any other suitable material. In some embodiments, a covering or sheet 27 (shown in FIGS. 5-8) may be wrapped around the polymeric layer 26 and a portion of the switch housing 16. The sheet 27 may be a single, unitary sheet of leather, for example, or any decorative upholstery material.

The central shell 14 may be formed from a polymeric material, for example, and may encase the central member 20 and at least a portion of one or more of the structural members 22, 23. The central shell 14 may house an airbag assembly (not shown) and/or a portion of a horn assembly (not shown) mounted to the central member 20.

Figure 3:
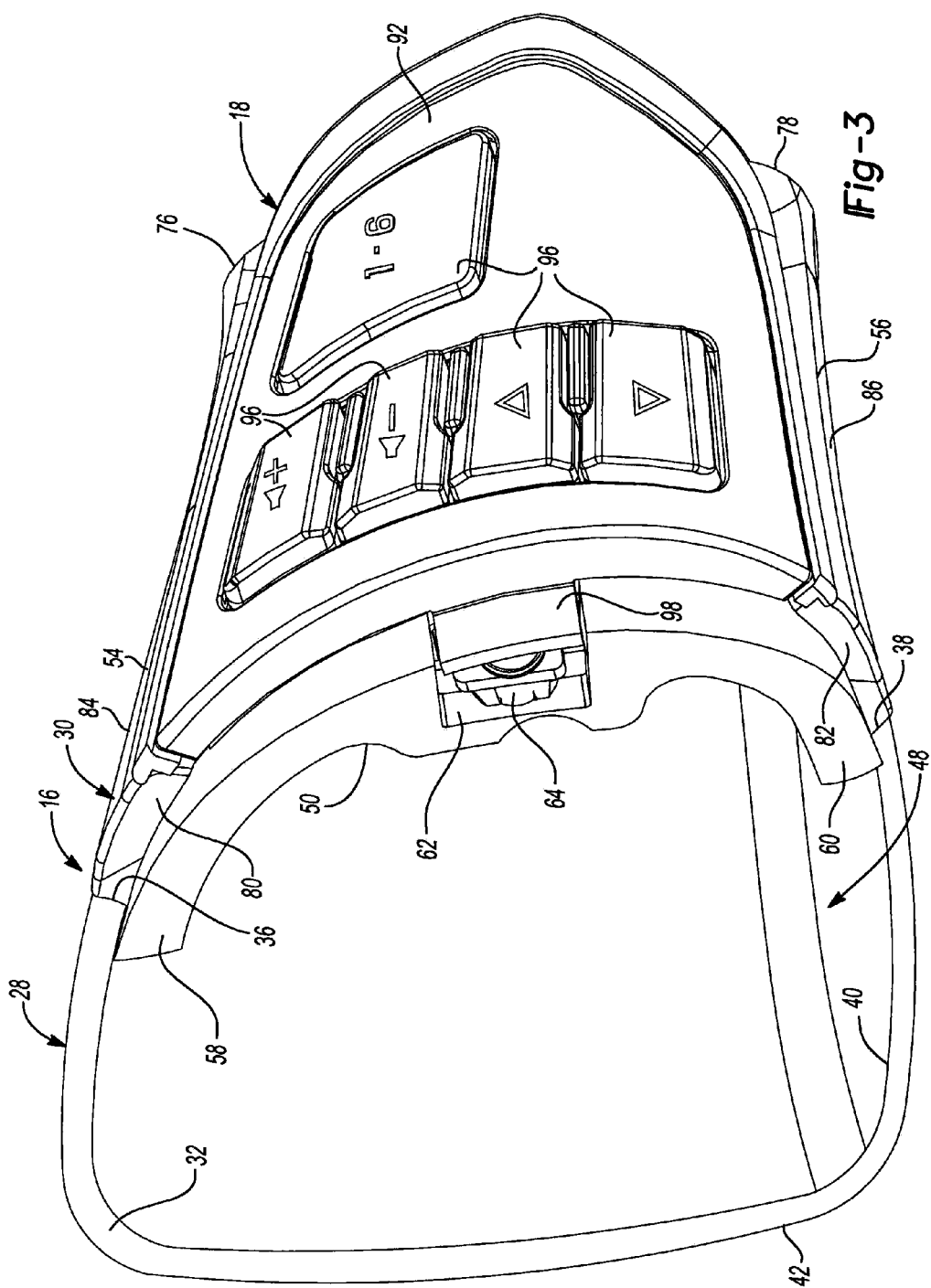
FIG. 3 is a perspective view of the switch-housing and switch assembly of FIG. 2.

In the particular embodiment illustrated, each of the two laterally extending structural members 22 may be at least partially surrounded by a corresponding one of the switch housings 16. As will be subsequently described, each switch housing 16 may support and at least partially house a corresponding one of the switch assemblies 18. Each switch housing 16 may include a back-cover 28 and a switch-frame 30, as shown in FIG. 3. In some embodiments, the back-cover 28 may be integrally formed with the central shell 14.

Figure 2:
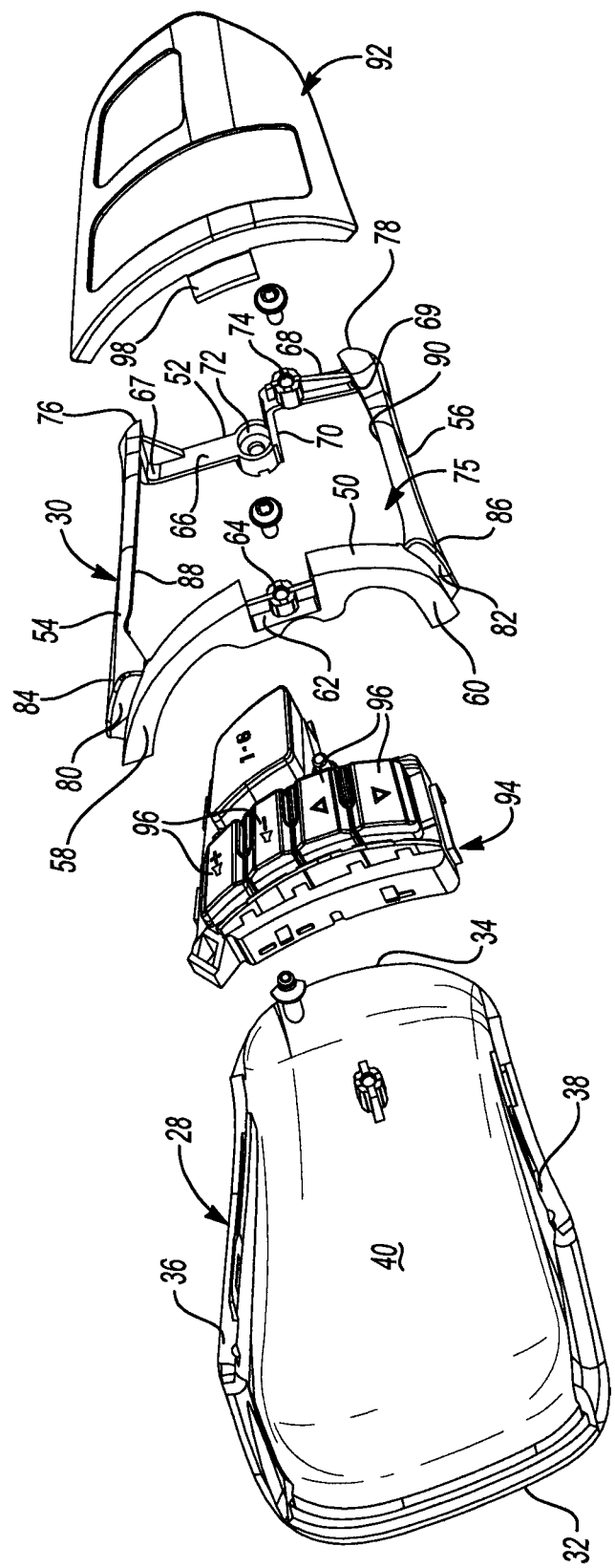
FIG. 2 is an exploded view of the switch-housing and switch assembly according to the principles of the present disclosure.
Figure 7:
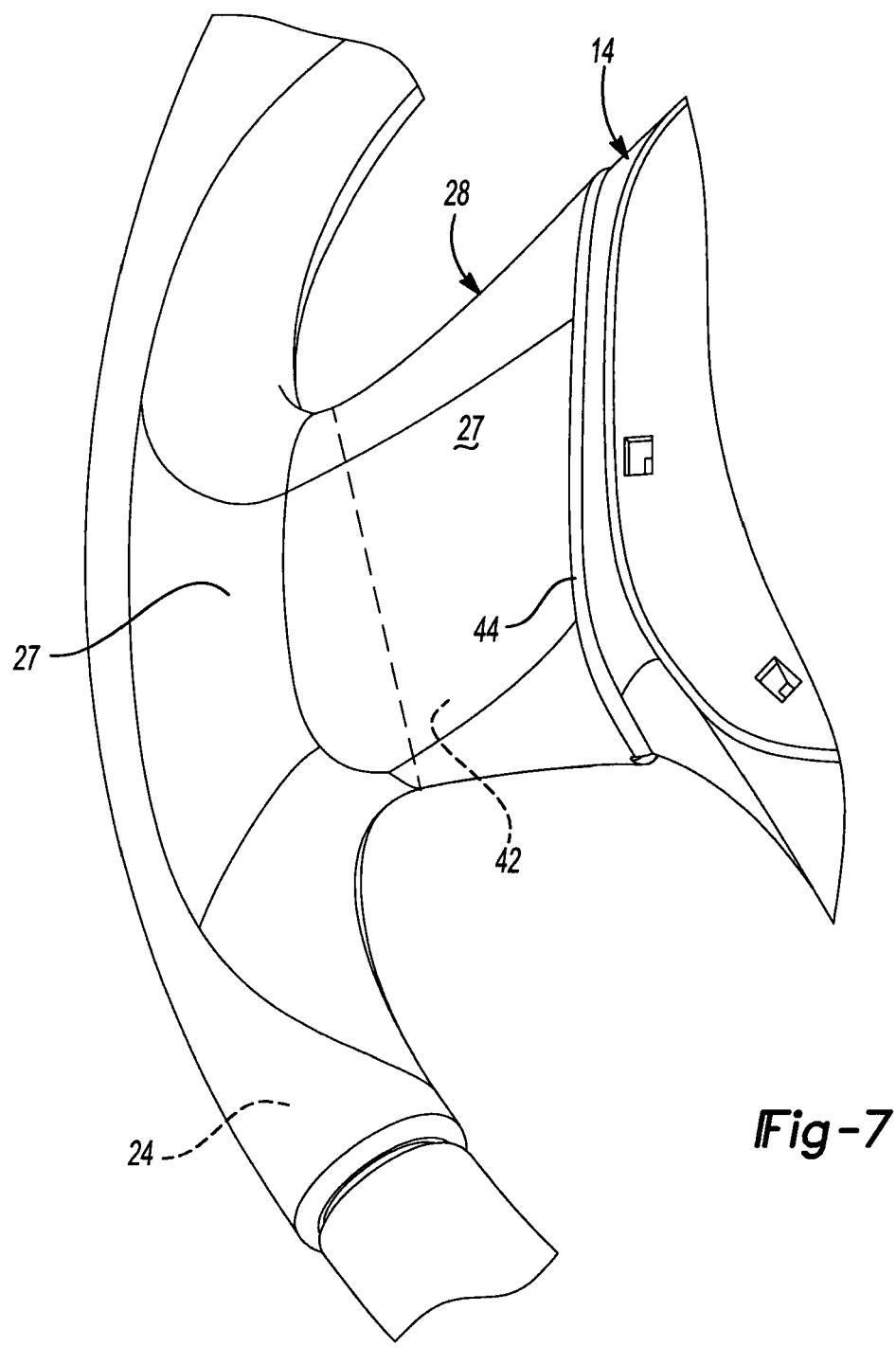
FIG. 7 is a partial perspective view of a back side of the steering wheel according to the principles of the present disclosure.
Figure 8:
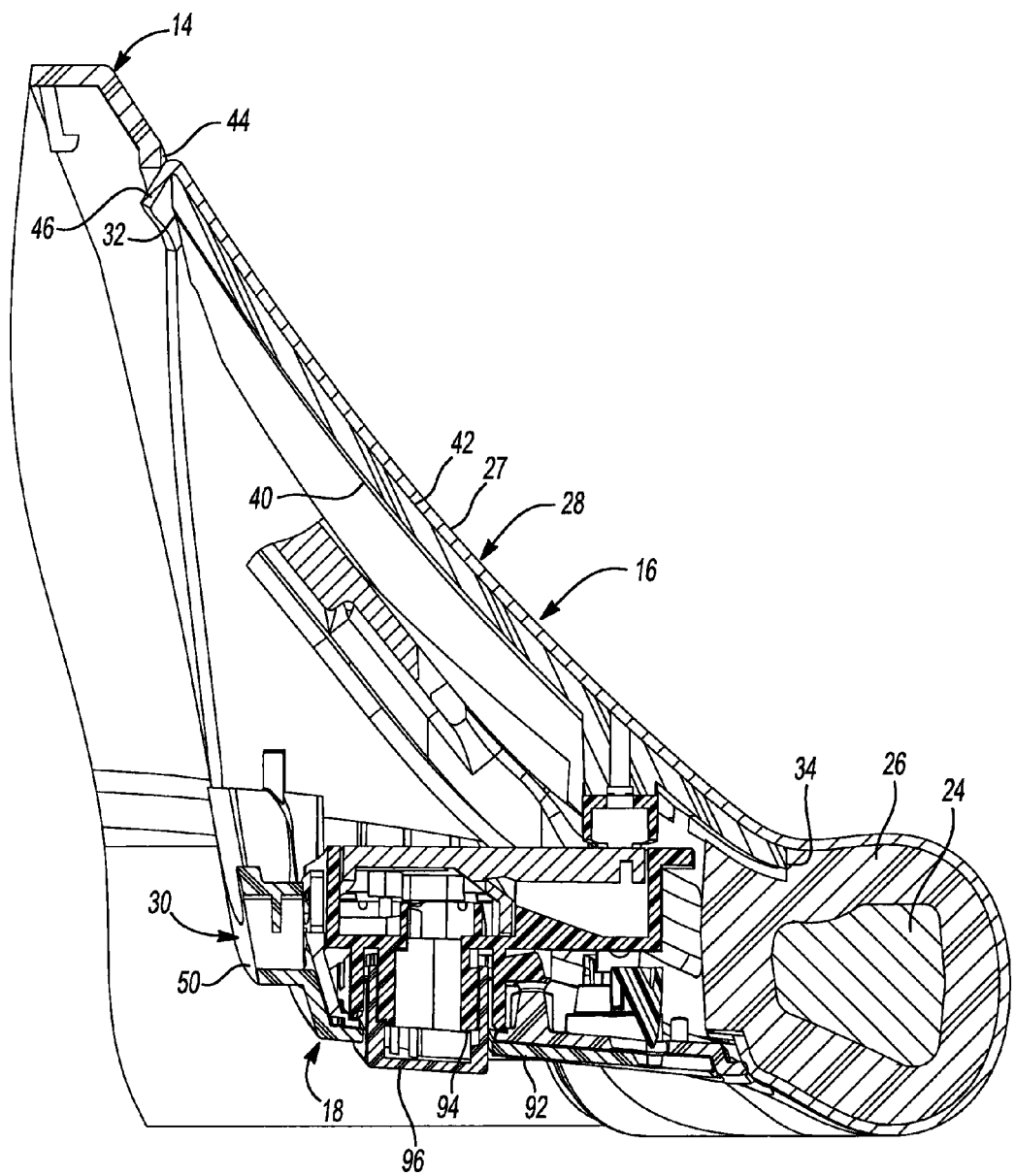
FIG. 8 is a partial cross-sectional view of the steering wheel according to the principles of the present disclosure.

As shown in FIGS. 2 and 3, the back-cover 28 may include a first end 32, a second end 34, a first edge 36, a second edge 38, an inner surface 40, and an outer surface 42. As shown in FIG. 8, the first end 32 may be connected to the central shell 14, and the second end 34 may be connected to the polymeric layer 26 surrounding the rim 24. The first end 32 may cooperate with the central shell 14 to form a tuck-groove 44 (FIGS. 7 and 8).

The leather sheet 27 may be wrapped around the outer surface 42 of the back-cover 28. As shown best in FIG. 8, an end 46 of the leather sheet 27 may be tucked into the tuck-groove 44 to retain the leather sheet 27 on the back-cover 28. It will be appreciated that the steering wheel 10 may include additional or alternative means for securing the leather sheet 27 to the back-cover 28.

The inner surface 40 of the back-cover 28 may define a cavity 48 having a generally U-shaped cross section, as shown in FIG. 3, for example. The cavity 48 may receive at least a portion of a corresponding one of the structural members 22 (FIG. 4), yet the inner surface 40 may be spaced apart from the structural member 22.

The back-cover 28 may be formed from a polymeric material. In some embodiments, the back-cover 28 may be formed from a relatively hard and rigid polymeric material such as polypropylene or acrylonitrile butadiene styrene (ABS), for example. In other embodiments, the back-cover could be formed from a softer or more compliant material such as polyurethane or a polymeric foam, for example.

Figure 4:
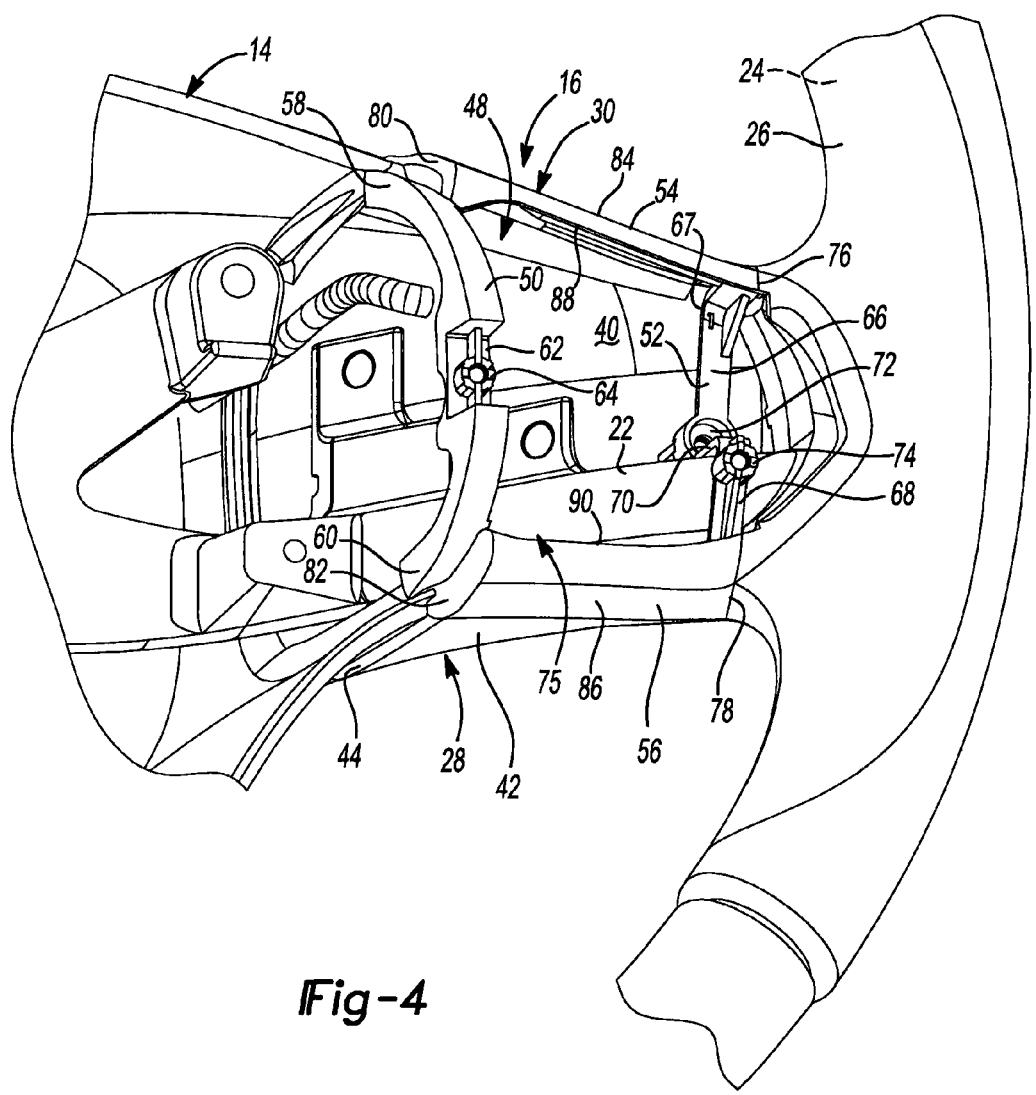
FIG. 4 is a partial perspective view of the steering wheel with the switch assembly and a leather sheet removed according to the principles of the present disclosure.
Figure 5:
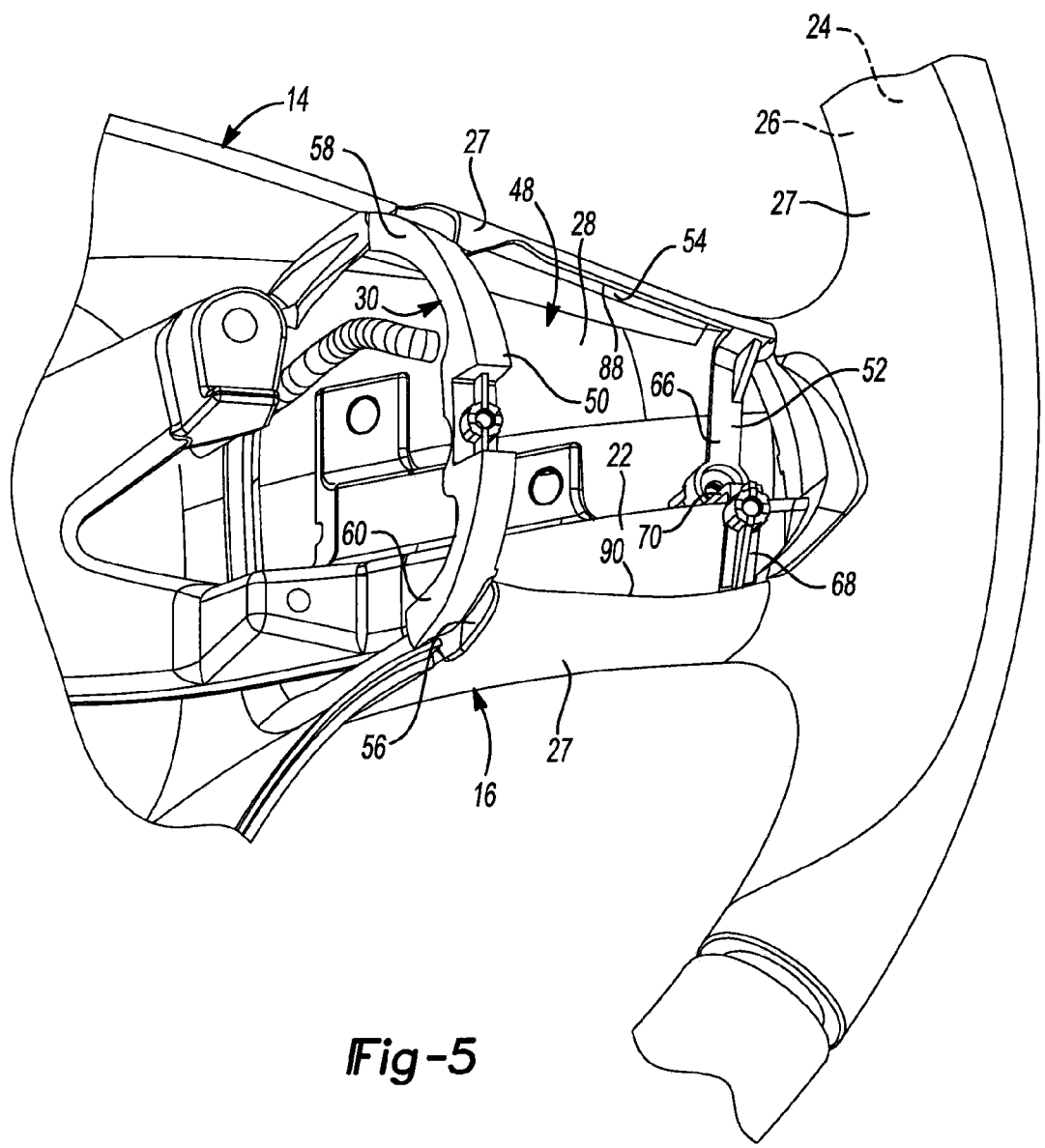
FIG. 5 is a partial perspective view of the steering wheel with the leather sheet installed according to the principles of the present disclosure.
Figure 6:
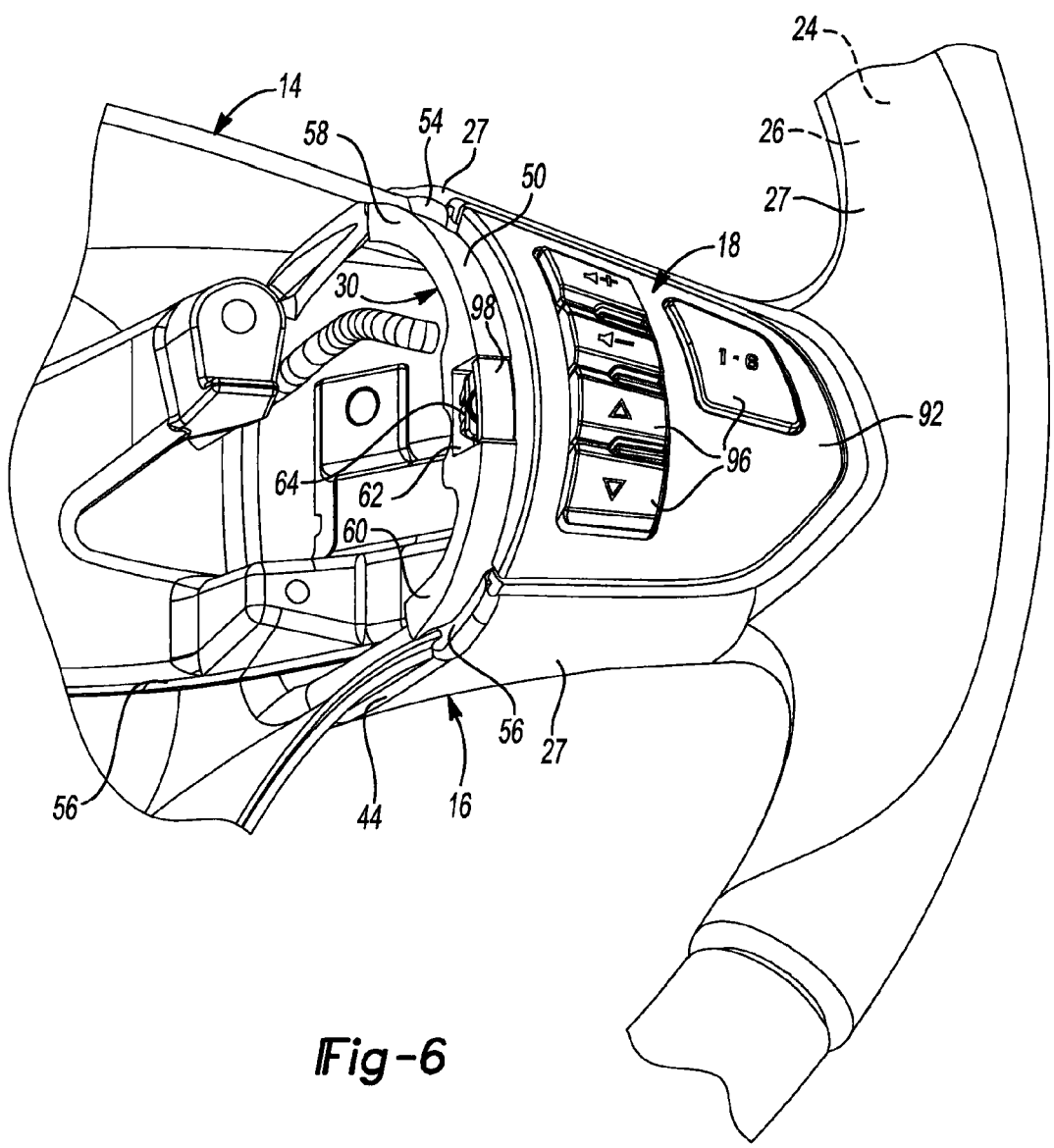
FIG. 6 is a partial perspective view of the steering wheel with the switch assembly and the leather sheet installed according to the principles of the present disclosure.

The switch-frame 30 may be mounted to the first and second edges 36, 38 of the back-cover 28 and may extend between the central shell 14 and the polymeric layer 26 of the rim 24, as shown in FIGS. 3 and 4. The switch-frame 30 may be formed from a relatively hard and rigid polymeric material. As shown in FIG. 2, the switch-frame 30 may include a first member 50, a second member 52, a third member 54, and a fourth member 56. In some embodiments, the first, second, third and fourth members 50, 52, 54, 56 may be integrally formed with each other, while in other embodiments, the first, second, third and fourth members 50, 52, 54, 56 may be discrete components connected to each other.

The first member 50 may be disposed adjacent the central shell 14 and may include a first end 58 and a second end 60, as shown in FIG. 4. In some embodiments, the first member 50 may be an arched member extending laterally across and spaced apart from the structural member 22 received in the cavity 48. The first member 50 may include a recessed portion 62 having a mounting feature 64 to which the switch assembly 18 may be secured.

The second member 52 may be disposed adjacent the polymeric layer 26 surrounding the rim 24 and may include a first portion 66 having a first end 67, and a second portion 68 having a second end 69. A third portion 70 may interconnect the first and second portions 66, 68 and may offset the second portion 68 from the first portion 66 to provide clearance for the structural member 22, as shown in FIG. 4. In some embodiments, the second member 52 may be spaced apart from the structural member 22. In other embodiments, the structural member 22 may support the second portion 68 of the second member 52, for example. The first and second portions 66, 68 may include first and second mounting features 72, 74, respectively, to which the switch assembly 18 may be secured.

The third member 54 may extend between the first end 58 of the first member 50 and the first end 67 of the second member 52. The fourth member 56 may extend between the second end 60 of the first member 50 and the second end 69 of the second member 52. The first, second, third and fourth members 50, 52, 54, 56 may cooperate to define an opening 75 in communication with the cavity 48, as shown in FIG. 4.

The third and fourth members 54, 56 may engage the first and second edges 36, 38, respectively, of the back-cover 28 via a snap fit and/or any other suitable engagement means. The third and fourth members 54, 56 may include first end portions 76, 78, respectively, that abut the polymeric layer 26 of the rim 24, as shown in FIG. 4. Second end portions 80, 82 of the third and fourth members 54, 56, respectively, may abut the central shell 14.

As shown in FIGS. 2, 3, 6 and 8, the switch assembly 18 may include a cover plate 92 and a switch module 94 having one or more buttons 96 adapted to control an electronic device or system of the vehicle such as a stereo, a cruise control system and/or a mobile communication device, for example. The cover plate 92 may be formed from a relatively rigid polymeric material. Some or all of the cover plate 92 could include chrome plating, for example, and/or other decorative features or finishes. The first, second, third and fourth members 50, 52, 54, 56 of the switch-frame 30 may support the cover plate 92. The cover plate 92 may engage one or more of the first, second, third and fourth members 50, 52, 54, 56 via a snap fit, an adhesive bond, one or more fasteners, and/or any other suitable fastening means. In the embodiment illustrated, the cover plate 92 may include a tab 98 that is received in the recessed portion 62 of the first member 50 of the switch-frame 30 to engage the mounting feature 64, as shown in FIG. 3. The switch module 94 may extend from the cover plate 92 into the opening 75 defined by the switch-frame 30 and into the cavity 48.

As shown in FIGS. 5-8, the leather sheet 27 may be wrapped around the back-cover 28, around the polymeric layer 26 of the rim 24, and around outer surfaces 84, 86 of the third and fourth members 54, 56, respectively. The leather sheet 27 may be folded over top edges 88, 90 of the third and fourth members 54, 56, respectively, and tucked into the opening 75 underneath the cover plate 92 of the switch assembly 18. In this manner, the leather sheet 27 may conceal any seams between the back-cover 28 and the switch-frame 30, seams between the switch-frame 30 and the polymeric layer 26 of the rim 24, and seams between the back-cover 28 and the polymeric layer 26. This may provide the appearance of a continuous surface extending around the rim 24 and the portion of the structural member 22 proximate the switch assembly 18. This also allows the leather sheet 27 to be installed snugly around the back-cover 28 and the switch frame 30 while still accommodating a relatively large switch assembly 18 without having to increase the size of the switch housing 16.

The structure of the switch housing 16 allows the steering wheel 10 to include larger switch assemblies 18 without increasing the size of the switch housing 16 and/or other structure surrounding the structural members 22. Furthermore, the structure of the switch housing 16 enables the switch housing 16, the central shell 14, and the rim 24 to be wrapped in the leather sheet 27 without fit and finish problems. Prior art steering wheels having such relatively large switch assemblies and relatively small switch housings could not successfully incorporate the leather wrapping of the present disclosure without unacceptable fit and finish problems. Therefore, the overall volumes of spokes (i.e., the volume of the overall structure surrounding the laterally extending structural members of the steering wheel frame) of prior-art steering wheels must be substantially increased if the size of the switch assemblies to be installed in these prior-art steering wheels is increased. Increasing the sizes of the overall spokes in this manner limits aesthetic design options and/or ergonomics of the steering wheel. Because the switch housing 16 of the present disclosure can remain relatively compact in size while still accommodating the relatively large switch assembly 18, desirable aesthetic and ergonomic design features can be achieved.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A steering wheel comprising:
a central member;
a rim spaced apart from the central member;
a structural member extending between the central member and the rim;
a switch-frame secured relative to the structural member and including first, second, and third members cooperating to define a through-opening, the first member being disposed between the central member and the rim and extending laterally across the structural member, the second and third members being spaced apart from each other and extending from the first member toward the rim; and
a switch assembly mounted to the switch-frame and at least partially extending through the through-opening.

2. The steering wheel of claim 1, wherein outward-facing surfaces of the second and third members are at least partially wrapped in a covering.

3. The steering wheel of claim 1, further comprising a back-cover at least partially surrounding the structural member and engaging the switch-frame.

4. The steering wheel of claim 3, wherein the back-cover is formed from a rigid polymeric material.

5. The steering wheel of claim 3, wherein an outer surface of the back-cover is wrapped in leather and outward-facing surfaces of the second and third members are wrapped in leather.

6. The steering wheel of claim 5, wherein the leather that is wrapped around the outer surface of the back-cover and the outward-facing surfaces of the second and third members is a single sheet of leather.

7. The steering wheel of claim 6, further comprising a polymeric shell at least partially surrounding the central member, the back-cover and the shell cooperating to form a tuck-groove receiving a portion of the sheet of leather.

8. The steering wheel of claim 6, wherein the rim is encased in a resiliently compliant polymeric material and the sheet of leather is wrapped around at least a portion of the resiliently compliant polymeric material.

9. The steering wheel of claim 1, wherein the switch-frame is formed from a rigid polymeric material.

10. The steering wheel of claim 1, wherein the switch assembly includes a cover plate mounted to the first, second, and third members.

11. The steering wheel of claim 1, wherein the switch-frame includes a fourth member extending between the second and third members, the fourth member being adjacent the rim.

12. A switch housing for a steering wheel comprising:
a back-cover adapted to be secured to a central shell of the steering wheel and defining a cavity adapted to receive at least a portion of a structural member of the steering wheel;
a switch-frame mounted to the back-cover and spaced apart from the structural member, the switch-frame including first, second and third members defining an opening and adapted to support a switch assembly, the second and third members extending from opposite ends of the first member;
a single sheet of covering material rapped around the back-cover and the second and third members of the switch-frame,
wherein at least a portion of the switch assembly extends through the opening into the cavity, and
wherein the back-cover and the central shell cooperate to form a tuck-groove receiving a portion of the single sheet of covering material.

13. The switch housing of claim 12, wherein the switch assembly includes a cover plate mounted to the first, second, and third members.

14. The switch housing of claim 12, wherein the switch-frame includes a fourth member extending between the second and third members, the fourth member being adjacent a rim of the steering wheel.

15. The switch housing of claim 12, wherein the back-cover and the switch-frame are spaced apart from the structural member.

16. The switch housing of claim 12, wherein the opening includes first and second open ends through which at least a portion of the switch assembly extends.

17. A switch housing for a steering wheel comprising:
a back-cover adapted to be secured to a central shell of the steering wheel and defining a cavity adapted to receive at least a portion of a structural member of the steering wheel; and
a switch-frame mounted to the back-cover and spaced apart from the structural member, the switch-frame including first, second and third members defining an opening and adapted to support a switch assembly, the second and third members extending from opposite ends of the first member,
wherein at least a portion of the switch assembly extends through the opening into the cavity,
wherein the switch-frame is formed from a rigid polymeric material.

18. The switch housing of claim 17, wherein the back-cover is formed from a rigid polymeric material.

* * * * *